No. 773,908. PATENTED NOV. 1, 1904.
A. G. WATERHOUSE.
METHOD OF PUMPING LIQUID.
APPLICATION FILED FEB. 11, 1904.
NO MODEL. 2 SHEETS—SHEET 2.
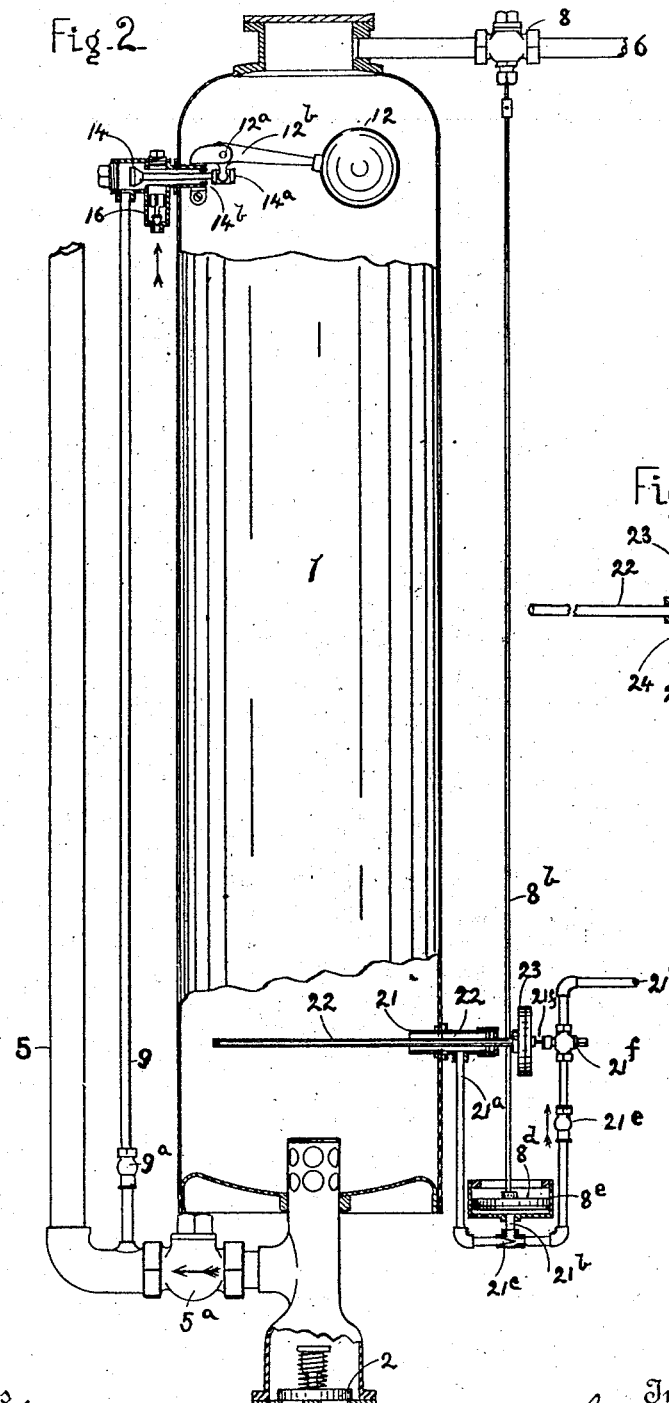
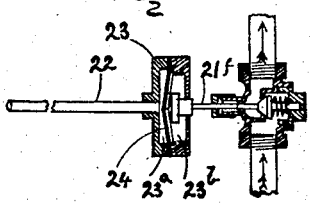

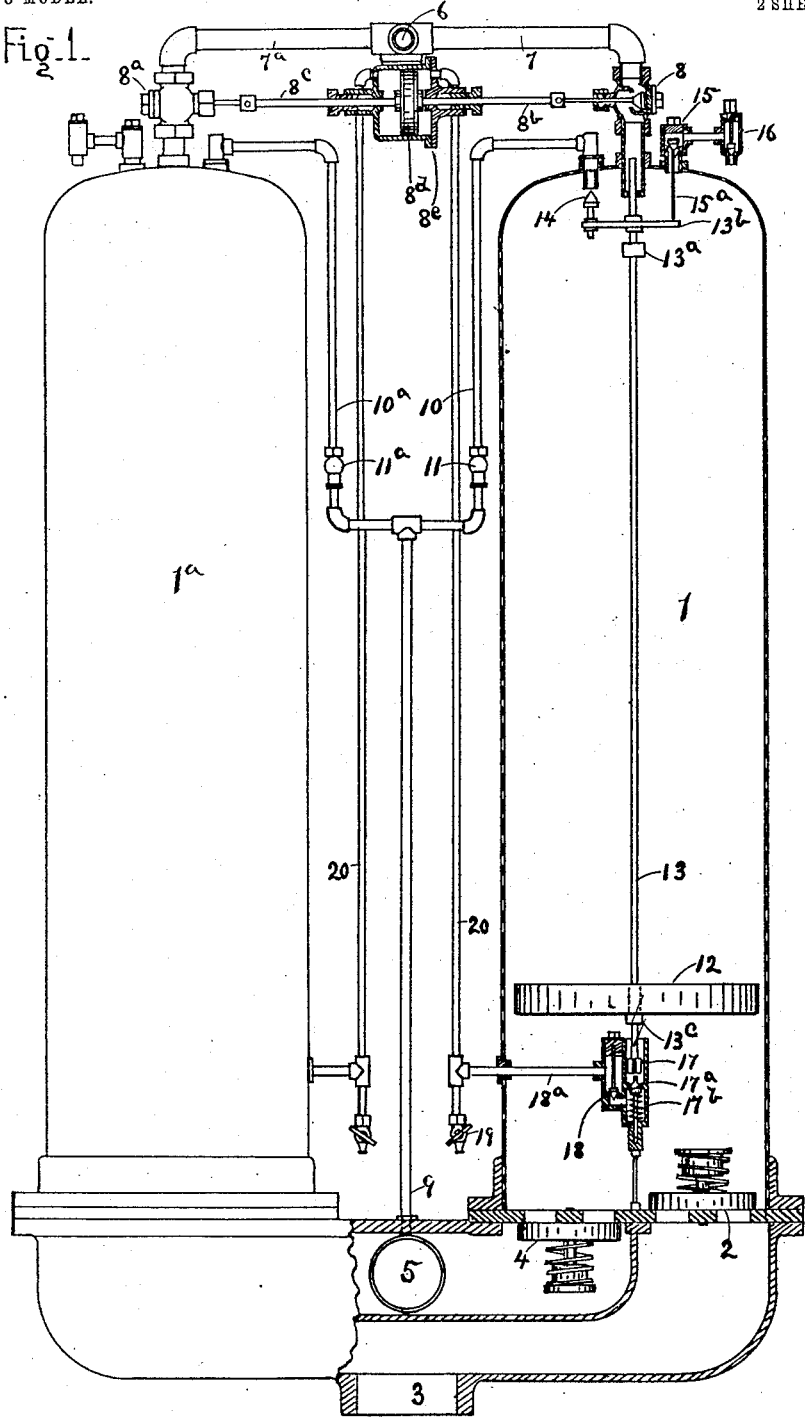

No. 773,908. Patented November 1, 1904.

UNITED STATES PATENT OFFICE.

ADDISON G. WATERHOUSE, OF ROCKLAND COUNTY, NEW YORK, ASSIGNOR TO WATERHOUSE STEAM AND VACUUM PUMP COMPANY, A CORPORATION OF MAINE.

METHOD OF PUMPING LIQUID.

SPECIFICATION forming part of Letters Patent No. 773,908, dated November 1, 1904.

Application filed February 11, 1904. Serial No. 193,037. (No model.)

*To all whom it may concern:*

Be it known that I, ADDISON G. WATERHOUSE, a citizen of the United States, residing in Rockland county, New York, have invented an Improved Method of Pumping Liquid, of which the following is a specification.

My invention relates to an improved method of pumping liquid through the medium of the direct pressure of steam upon liquid contained in a closed receptacle and the charging of such receptacle by a vacuum produced by reason of the condensation of steam in said receptacle. In carrying out my invention such receptacle is charged with liquid up to a predetermined level, the remaining space in the receptacle above the liquid being filled with air. Steam is then let on to the receptacle, which at first mingles with the air therein and then the two combined form a pressure upon the surface of the liquid, whereupon some steam is condensed and the air remains as an insulating stratum upon the liquid, which prevents condensation of the steam by the liquid, and during this operation the pressure of the steam forces the liquid from the receptacle through an eduction-passage until the surface of the liquid in the receptacle reaches a predetermined lower level that is above the level through which the liquid flows through the eduction-passage. Then the air on the surface of the liquid is discharged from the receptacle, whereby the steam is brought into direct contact with the liquid therein and whereby condensation of the steam occurs. Steam is then shut off from the receptacle substantially simultaneously with or closely, according to the time that the air is discharged from the surface of the liquid. Then a limited volume of liquid for condensing the steam is forced into the upper interior of the receptacle, whereby the contained steam is condensed, forming a vacuum in the receptacle, and liquid is thereby drawn through an induction-passage into the receptacle until the liquid reaches a substantially predetermined high level therein, and then the condensing liquid entering the receptacle is shut off and at about the same time air is admitted to fill the remaining space in the receptacle above the surface of the liquid therein. By this method a proper proportion of liquid and air is at all times provided in the receptacle to cause an efficient pumping operation. Steam is then again admitted to the receptacle and the above-named steps again follow in order, whereby the work of pumping liquid, as stated, is accomplished and continued.

The apparatus I have shown by which my improved method of pumping liquid may be carried out comprises, primarily, a closed receptacle provided with an induction liquid pipe and valve, an eduction liquid pipe and valve, a steam-pipe leading from a source of supply to the upper interior of the receptacle, a condensing-water pipe leading into the receptacle at a point near its upper interior, an air-inlet leading into the receptacle with means to control the admission of air approximately at the time the liquid in the receptacle reaches a predetermined high level, and means for also stopping the flow of condensing liquid into the receptacle at such time, and an air-discharge located approximately above the level through which the liquid is discharged from the receptacle, with means to cause the sudden discharge of air from the receptacle when the liquid therein reaches approximately a predetermined low level.

Suitable mechanism for carrying out my improved method of pumping liquid is illustrated in the accompanying drawings, in which—

Figure 1 is a partly-sectional side elevation of an apparatus having two liquid-receptacles and devices for permitting the operations above set forth. Fig. 2 is a sectional side view of a slightly-modified form of apparatus having a single liquid-receptacle, and Fig. 3 is a sectional detail view hereinafter explained.

Similar numerals of reference indicate corresponding parts in the several views.

Referring to the first form of apparatus shown in Fig. 1, the numerals 1 1ª indicate two receptacles, each having liquid-induction valves 2 and a common induction-passage 3, also eduction-valves 4 and a common eduction-passage 5, and at 6 is indicated a steam-supply pipe, shown having branches 7 7$^a$ leading to the receptacles 1 1$^a$, respectively, and provided with steam-valves 8 8$^a$, shown connected by stems 8$^b$ 8$^c$ with a piston 8$^d$ within a cylinder 8$^e$. At 9 is a pipe for condensing liquid leading from the eduction-pipe 5 and shown having two branches 10 10$^a$ provided with check-valves 11 11$^a$ and leading to the upper interior of the receptacles 1 1$^a$, respectively. Each of these receptacles is provided with similar operative parts, and therefore a description of one will suffice. Within each receptacle is located a float (indicated at 12) which rests upon and follows the surface of the contained liquid and is adapted to travel up and down upon the valve-rod 13. While this float to an extent covers the surface of the liquid in the receptacle and acts as an insulating medium between the steam and the liquid, it also performs the work of operating valves, as follows: Upon rod 13 is a collar 13$^a$, which the float 12 is adapted to strike as liquid rises in the receptacle, and the float thereupon raises the rod 13 and closes the condensing-liquid valve 14, connected with said rod, which then shuts off the inflow of condensing liquid from the corresponding branch pipe. At 15 is an air-inlet valve communicating with the receptacle, and at 16 is an air-check valve communicating with valve 15 to permit the inflow of air to the receptacle, but to prevent outflow of fluid therefrom. The stem 15$^a$ of valve 15 is shown in position to be operated by an extension 13$^b$ of rod 13. When the float 12 rises, so as to lift rod 13 and close the condensing-water-inlet valve 14, it about the same time opens valve 15 to admit air through the check-valve 16 into the receptacle. By such means liquid is permitted to enter the receptacle until it reaches a predetermined level therein. Then the condensing liquid is shut off and at or about the same time air is admitted to break the vacuum and fill the remaining space in the receptacle with air, whereby the proper portion of both liquid and air is secured at each operation in order to effect efficient results. Steam must be used at each stroke to completely fill the receptacle down to the lowest extreme to which the liquid is forced therefrom, and if the receptacle should be but partly filled with liquid there will be less liquid forced out and still a full charge of steam will be used, while, on the other hand, if too little air is admitted undue condensation of steam will occur, according to the lack of sufficient air to form an insulating stratum upon the liquid, and, furthermore, if too much condensing liquid is used or allowed to enter the receptacle after the steam has all been condensed such surplus liquid will be wasted, Therefore the necessity of shutting off the inflowing condensing liquid and admitting the proper volume of air above the liquid in the receptacle at the right time and in the proper order is apparent. When the receptacle is charged with its proper complements of water and air, then steam is let on, and this is effected in the form of apparatus shown in Fig. 1 by opening the steam-valve for one receptacle at the time that the steam is shut off from the other receptacle. After steam is passed into the receptacle 1 the liquid therein is forced down and out through the eduction-valve 4 and passage 5 under a pressure according to that of the steam until the surface of the liquid lowers, so that the float 12 encounters a collar 13$^c$ on rod 13, and then the weight of the float will press said rod down upon the movable parts 17$^a$ of the valve 17 and open it by overcoming the pressure of spring 17$^b$. This will allow some liquid and the air upon the surface of the liquid to escape through the valve 17 and out through the check-valve 18 and pipe 18$^a$ to the adjustable blow-off or drip 19, which is connected by a pipe 20 with cylinder 8$^e$ on one side of piston 8$^d$, the pipe 20 of the other receptacle being connected with cylinder 8$^e$ on the opposite side of the piston. As the air is thus discharged from the receptacle into pipe 20 part escapes through the cock 19, and an air-pressure is transmitted up pipe 20 into cylinder 8$^e$, whereby the piston is moved to close the steam-valve of the corresponding receptacle (as 1) and at the same time open the steam-valve of the other receptacle to admit steam thereto, thereby causing an alternate pumping action of emptying one receptacle of liquid while the other is being filled. As soon as the air is discharged from the surface of the liquid in one receptacle (as 1) the steam therein comes in contact with the remaining liquid, which results in condensation, whereby the pressure in such receptacle is lowered and permits condensing liquid to return from the discharge-pipe 5 up through the pipe 9, branch pipe 10, past check-valve 11 and valve 14 into the upper interior of the receptacle, whereby the steam therein is completely condensed, a vacuum formed, and a new charge of liquid is drawn in through the induction-passage, and when such liquid rises valve 17 closes, the float 12 rises so as to strike the collar 13$^a$, and the condensing-liquid valve 14 is closed to shut off inflowing condensing liquid and the air-inlet valve 15 is opened to admit air to fill the space remaining in the receptacle above the liquid. At such time the liquid in the other receptacle, as at 1$^a$, will have been lowered so that its valve 17 will open and the air from the surface of the liquid therein will then be suddenly discharged and its pressure will operate the piston 8$^d$ to shut steam off from that receptacle and open the valve 8 to let steam into the other receptacle. Thus the various steps of my improved method of pumping liquid occur in proper order in each receptacle and in the arrangements shown in Fig. 1 are so timed that the operations will alternately occur with respect to each receptacle, so that a substantially continuous pumping operation takes place—that is to say, in each receptacle condensing liquid is admitted, liquid is drawn in until it reaches a substantially predetermined high level, the condensing liquid is shut off, air is admitted to fill the remaining space in the receptacle, steam is then admitted, the liquid discharged, and when it reaches a substantially predetermined low level the air is suddenly discharged from its surface, condensation of the steam commences, the supply of steam to the receptacle is shut off, and condensation therein again occurs, when the steam is then turned on to the other receptacle.

In Fig. 2 an apparatus is shown in which the same method is carried out; but the pumping is intermittent in that a single receptacle 1 is used and provided with liquid induction and eduction means, a check-valve $5^a$ is placed in the discharge-pipe 5, a check-valve $9^a$ is located in the condensing-liquid pipe 9, and also automatic means are provided for causing the several steps of the method and in the order before set forth to be carried out. In this form of apparatus the float 12 is pivotally supported, as at $12^a$, and has a bell-crank lever $12^b$, which engages the stem $14^a$ of the condensing-liquid valve 14, the arrangement being such that the upward movement of float 12, caused by the proper volume of liquid being drawn into the receptacle, closes the valve 14 and shuts off the inflow of condensing liquid and at the same time allows the vacuum in the receptacle to draw air in through the check-valve 16, and as the air-check valve 16 is shown connected with the passage for the condensing liquid between the valve 14 and the receptacle it will be understood that while the condensing liquid is being forced through such passage past the valve 14 and spray or stricture $14^b$ the back pressure of this water keeps the air-check 16 closed, so that no air can enter until the proper time, which is permitted when the float 12 rises and closes the valve 14, and thereby permits the check-valve 16 to open. The steam-valve 8, which is caused to open and close in accordance with the extreme rise and fall of liquid in the receptacle, is operated (in the form shown in Fig. 2) by the piston $8^d$ in the cylinder or chamber $8^e$, connected by rod $8^b$ with said valve 8. Said piston has a limited motion, so that when it is raised the valve 8 is opened and the steam turned on and when the piston falls the steam is shut off. The means shown for operating the piston and valve 8 are as follows: At 21 is an air-blowout passage leading from receptacle 1 and communicating with a pipe $21^a$, leading to an outlet $21^d$, and having an injector $21^c$, communicating by branch $21^b$ with cylinder $8^e$. The pipe $21^a$ has a check-valve $21^e$ and a globe-valve $21^f$, which is normally closed. At 22 is indicated a thermostat, which is shown in the form of a tube having its inner end closed and extending horizontally into the receptacle 1 at about the level at which the water is to be discharged therefrom, being shown located within the air-discharge passage 21, and said thermostat-tube communicates with a casing 23, as shown in Fig. 3, provided with chambers $23^a$ $23^b$ on opposite sides of a diaphragm 24, with one of which chambers the thermostat 22 communicates, and said tube is charged with alcohol or other volatile fluid capable of quickly expanding by reason of steam heat as the liquid in the receptacle lowers to the level of the thermostat 22. The steam of the globe-valve $21^f$ bears against said diaphragm when the valve is closed, and as the material of the thermostat is expanded by the steam heat it causes the globe-valve to open, whereby the air from the surface of the liquid is permitted to suddenly escape from the surface of the liquid in receptacle and in so doing causes the injector $21^c$ to withdraw the pressure from under the piston $8^d$ and cause it to move downwardly by gravitation to close the steam-valve 8, thereby shutting off the steam from the receptacle when the surface of the liquid therein reaches a predetermined low level. As the air is thus discharged from the surface of the liquid in the receptacle the steam will descend upon the liquid and condensation will take place, and thereupon liquid of condensation will enter the receptacle through pipe 9, and when the receptacle is again recharged with liquid, so that the float 12 is again raised, condensing liquid shut off, and air admitted into the receptacle above the liquid therein, the cool liquid drawn into the receptacle will condense the gases in the thermostat 22 and allow the globe-valve $21^f$ to close. This will cause the weight of the water in the receptacle to transmit a pressure from the injector $21^c$ through pipe $21^b$ to the space under the piston $8^d$, causing the same to rise and open the steam-valve 8, thereby letting on steam immediately after the receptacle has received its proper charge of water and complement of air.

My improved method of pumping liquid may be conveniently carried into effect by apparatus differing in details from the arrangements shown.

I do not in this application claim the mechanism herein shown and described with respect to the control of the inflow of air to the receptacle and the discharge of air therefrom and the control of the inflowing steam by such discharged air, as that is embraced in the subject-matter of my pending applications, Serial No. 181,625, filed November 18, 1903, and Serial No. 188,174, filed January 8, 1904, and I reserve the right to file an application embracing the means herein shown for controlling the inflow of condensing liquid.

Having now described my invention, what I claim is—

1. The herein-described method of pumping liquid consisting in admitting steam to a receptacle containing liquid and air to discharge the liquid therefrom, discharging air from the surface of the liquid upon the liquid reaching an approximately predetermined low level in the receptacle thereby causing condensation of steam to start, shutting off the supply of steam to the receptacle, admitting liquid to the receptacle to complete condensation of steam therein, charging the receptacle with liquid up to substantially a predetermined high level therein, admitting air to the receptacle when the liquid has reached such high level therein, and again admitting steam to the receptacle to act upon the liquid therein, substantially as described.

2. The herein-described method of pumping liquid consisting in admitting steam to a receptacle containing liquid and air to discharge the liquid therefrom, discharging air from the surface of the liquid upon the latter reaching an approximately predetermined low level in the receptacle thereby causing condensation of steam to start, shutting off the supply of steam to the receptacle, admitting liquid to the receptacle to complete condensation of steam therein, charging the receptacle with liquid up to substantially a predetermined high level therein, admitting air to the receptacle when the liquid has reached such high level therein, and shutting off the inflow of condensing liquid to the receptacle and admitting air thereto to fill the space within the receptacle above the liquid, substantially as described.

3. The herein-described method of pumping liquid consisting in admitting steam to a receptacle containing liquid and air to discharge the liquid therefrom, discharging the air from the surface of the liquid upon the liquid reaching an approximately predetermined low level in the receptacle, employing such discharged air for causing the supply of steam to be shut off from the receptacle, causing condensation of steam to start in the receptacle by reason of the withdrawal of the insulating air from between the surface of the liquid and the main body of the steam, admitting liquid to the receptacle to complete condensation of steam therein, charging the receptacle with liquid up to substantially a predetermined high level therein, admitting air to the receptacle upon the liquid reaching a high level therein, and again admitting steam to the receptacle after the air has been admitted thereto and the liquid therein has reached a high level, substantially as described.

4. The herein-described method of pumping liquid consisting in admitting steam to a receptacle containing liquid and air to discharge the liquid therefrom, discharging the air from the surface of the liquid upon the liquid reaching an approximately predetermined low level in the receptacle, employing such discharged air for causing the supply of steam to be shut off from the receptacle, causing condensation of steam to start in the receptacle by reason of the withdrawal of the insulating air from between the surface of the liquid and the main body of steam, admitting liquid to the receptacle to complete condensation of steam therein, charging the receptacle with liquid up to substantially a predetermined high level therein, stopping the admission of condensing liquid into the receptacle after the latter is charged with liquid up to substantially a predetermined high level, admitting air to the receptacle upon the liquid reaching a high level therein, and again admitting steam to the receptacle after the air has been admitted thereto and the liquid therein has reached a high level, substantially as described.

ADDISON G. WATERHOUSE.

Witnesses:
T. F. BOURNE,
M. HOLLINGSHEAD.